United States Patent
Pang et al.

(10) Patent No.: US 11,236,618 B2
(45) Date of Patent: *Feb. 1, 2022

(54) TURBINE ENGINE AIRFOIL WITH A SCALLOPED PORTION

(71) Applicant: General Electric Company, Schenectady, NY (US)

(72) Inventors: Tingfan Pang, West Chester, OH (US); Helen Ogbazion Gabregiorgish, San Francisco, CA (US); Zachary Daniel Webster, Mason, OH (US); Gregory Terrence Garay, West Chester, OH (US); Steven Robert Brassfield, Cincinnati, OH (US); Daniel Endecott Osgood, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/082,288

(22) Filed: Oct. 28, 2020

(65) Prior Publication Data

US 2021/0040858 A1   Feb. 11, 2021

Related U.S. Application Data

(63) Continuation of application No. 16/386,972, filed on Apr. 17, 2019, now Pat. No. 10,844,728.

(51) Int. Cl.
*F01D 5/18* (2006.01)

(52) U.S. Cl.
CPC ............ *F01D 5/18* (2013.01); *F05D 2220/32* (2013.01); *F05D 2260/20* (2013.01)

(58) Field of Classification Search
None
See application file for complete search history.

(56) References Cited

U.S. PATENT DOCUMENTS

| | | | |
|---|---|---|---|
| 4,142,824 A | 3/1979 | Anderson |
| 4,203,706 A | 5/1980 | Hess |
| 4,487,550 A | 12/1984 | Horvath et al. |
| 4,505,639 A | 3/1985 | Groess et al. |
| 4,669,957 A | 6/1987 | Phillips et al. |
| 4,672,727 A | 6/1987 | Field |
| 4,726,735 A | 2/1988 | Field et al. |
| 4,859,147 A | 8/1989 | Hall et al. |
| 4,920,742 A | 5/1990 | Nash et al. |
| 5,223,320 A | 6/1993 | Richardson |
| 5,356,265 A | 10/1994 | Kercher |
| 5,383,766 A | 1/1995 | Przirembel et al. |

(Continued)

FOREIGN PATENT DOCUMENTS

| | | |
|---|---|---|
| EP | 3124745 A1 | 2/2017 |
| EP | 3124746 A1 | 2/2017 |

(Continued)

*Primary Examiner* — Michael Lebentritt
(74) *Attorney, Agent, or Firm* — McGarry Bair PC (57) ABSTRACT

An airfoil for a turbine engine can include an outer wall bounding an interior and defining a pressure side and a suction side extending between a leading edge and a trailing edge to define a chord-wise direction and extending between a root and a tip to define a span-wise direction. A plurality of outlets and a plurality of scalloped portions can extend along the outer wall.

20 Claims, 4 Drawing Sheets

(56) References Cited

U.S. PATENT DOCUMENTS

| | | |
|---|---|---|
| 5,387,085 A | 2/1995 | Thomas, Jr. et al. |
| 5,392,515 A | 2/1995 | Auxier et al. |
| 5,405,242 A | 4/1995 | Auxier et al. |
| 5,486,093 A | 1/1996 | Auxier et al. |
| 5,503,529 A | 4/1996 | Anselmi et al. |
| 5,660,523 A | 8/1997 | Lee |
| 5,667,359 A | 9/1997 | Huber et al. |
| 5,702,232 A | 12/1997 | Moore |
| 5,720,431 A | 2/1998 | Sellers et al. |
| 5,931,638 A | 8/1999 | Krause et al. |
| 6,066,485 A | 5/2000 | Guthridge et al. |
| 6,086,328 A | 7/2000 | Lee |
| 6,099,251 A | 8/2000 | LaFleur |
| 6,241,468 B1 | 6/2001 | Lock et al. |
| 6,254,334 B1 | 7/2001 | LaFleur |
| 6,379,118 B2 | 4/2002 | Lutum et al. |
| 6,402,470 B1 | 6/2002 | Kvasnak et al. |
| 6,402,471 B1 | 6/2002 | Demers et al. |
| 6,478,537 B2 | 11/2002 | Junkin |
| 6,551,062 B2 | 1/2003 | Leeke et al. |
| 6,773,231 B2 | 8/2004 | Bunker et al. |
| 6,790,005 B2 | 9/2004 | Lee et al. |
| 6,832,889 B1 | 12/2004 | Lee et al. |
| 6,869,270 B2 | 3/2005 | Bunker et al. |
| 6,994,514 B2 | 2/2006 | Soechting et al. |
| 7,121,787 B2 | 10/2006 | Jacks et al. |
| 7,255,534 B2 | 8/2007 | Liang |
| 7,334,412 B2 | 2/2008 | Tiemann |
| 7,364,405 B2 | 4/2008 | Cunha et al. |
| 7,467,922 B2 | 12/2008 | Beeck et al. |
| 7,497,660 B2 | 3/2009 | Liang |
| 7,563,072 B1 | 7/2009 | Liang |
| 7,575,414 B2 | 8/2009 | Lee |
| 7,632,062 B2 | 12/2009 | Harvey et al. |
| 7,665,956 B2 | 2/2010 | Mitchell et al. |
| 7,670,113 B1 | 3/2010 | Liang |
| 7,686,580 B2 | 3/2010 | Cunha et al. |
| 7,686,582 B2 | 3/2010 | Cunha |
| 7,785,071 B1 | 8/2010 | Liang |
| 7,789,626 B1 | 9/2010 | Liang |
| 7,815,414 B2 | 10/2010 | Devore et al. |
| 8,043,058 B1 | 10/2011 | Liang |
| 8,057,182 B2 | 11/2011 | Brittingham et al. |
| 8,079,812 B2 | 12/2011 | Okita |
| 8,092,176 B2 | 1/2012 | Liang |
| 8,105,030 B2 | 1/2012 | Abdel-Messeh et al. |
| 8,109,726 B2 | 2/2012 | Liang |
| 8,172,534 B2 | 5/2012 | Ammann et al. |
| 8,262,357 B2 | 9/2012 | Mhetras |
| 8,313,287 B2 | 11/2012 | Little |
| 8,317,476 B1 | 11/2012 | Liang |
| 8,454,310 B1 | 6/2013 | Downs |
| 8,469,666 B1 | 6/2013 | Liang |
| 8,647,053 B2 | 2/2014 | Hsu et al. |
| 8,651,805 B2 | 2/2014 | Lacy et al. |
| 8,714,926 B2 | 5/2014 | Lee et al. |
| 8,840,363 B2 | 9/2014 | Lee |
| 8,851,848 B1 | 10/2014 | Liang |
| 8,864,469 B1 | 10/2014 | Liang |
| 9,004,866 B2 | 4/2015 | Lee et al. |
| 9,091,176 B2 | 7/2015 | Martin et al. |
| 9,133,715 B2 | 9/2015 | Lutjen et al. |
| 9,151,175 B2 | 10/2015 | Tham et al. |
| 9,234,438 B2 | 1/2016 | Lee |
| 9,249,670 B2 | 2/2016 | Bunker |
| 9,260,972 B2 | 2/2016 | Zelesky et al. |
| 9,273,561 B2 | 3/2016 | Lacy et al. |
| 9,279,330 B2 | 3/2016 | Xu et al. |
| 9,297,262 B2 | 3/2016 | Zhang et al. |
| 9,366,143 B2 | 6/2016 | Lee et al. |
| 9,394,796 B2 | 7/2016 | Lacy et al. |
| 9,447,692 B1 | 9/2016 | Liang |
| 9,470,095 B2 | 10/2016 | Propheter-Hinckley et al. |
| 9,605,545 B2 | 3/2017 | Grohens et al. |
| 9,670,782 B2 | 6/2017 | Gohler et al. |
| 9,777,577 B2 | 10/2017 | Brandi et al. |
| 9,777,582 B2 | 10/2017 | Zelesky et al. |
| 9,840,927 B2 | 12/2017 | Tucker |
| 9,840,930 B2 | 12/2017 | Lee et al. |
| 9,845,731 B2 | 12/2017 | Bimkrant et al. |
| 9,856,739 B2 | 1/2018 | Bedrosyan et al. |
| 9,879,601 B2 | 1/2018 | Vandervaart et al. |
| 9,890,644 B2 | 2/2018 | Tran et al. |
| 9,896,942 B2 | 2/2018 | Shepherd |
| 9,896,954 B2 | 2/2018 | Walston et al. |
| 9,938,836 B2 | 4/2018 | Weber et al. |
| 9,938,899 B2 | 4/2018 | Miranda et al. |
| 9,957,817 B2 | 5/2018 | Zelesky et al. |
| 9,982,541 B2 | 5/2018 | Kwon et al. |
| 10,844,728 B2 * | 11/2020 | Pang ..................... F01D 5/187 |
| 2006/0002788 A1 | 1/2006 | Liang |
| 2010/0111700 A1 | 5/2010 | Kim et al. |
| 2013/0251520 A1 | 9/2013 | Barr et al. |
| 2014/0033736 A1 | 2/2014 | Propheter-Hinckley et al. |
| 2014/0093391 A1 | 4/2014 | Pointon et al. |
| 2015/0017018 A1 | 1/2015 | Lacy et al. |
| 2015/0345298 A1 | 12/2015 | Mongillo et al. |
| 2015/0345304 A1 | 12/2015 | Mongillo et al. |
| 2016/0076552 A1 | 3/2016 | Anderson et al. |
| 2016/0097285 A1 | 4/2016 | Harding et al. |
| 2016/0153467 A1 | 6/2016 | Mahias et al. |
| 2016/0169003 A1 | 6/2016 | Wong et al. |
| 2016/0230564 A1 | 8/2016 | Mongillo, Jr. et al. |
| 2016/0237828 A1 | 8/2016 | Burd |
| 2017/0007824 A1 | 1/2017 | Gardner et al. |
| 2017/0030198 A1 | 2/2017 | Kruckels et al. |
| 2017/0211415 A1 | 7/2017 | Swift et al. |
| 2017/0234134 A1 | 8/2017 | Bunker |
| 2017/0298823 A1 | 10/2017 | Harding |
| 2017/0306746 A1 | 10/2017 | Konitzer et al. |
| 2018/0023397 A1 | 1/2018 | Vandeputte |
| 2018/0038233 A1 | 2/2018 | Lee et al. |
| 2018/0058226 A1 | 3/2018 | Tucker et al. |
| 2018/0128115 A1 | 5/2018 | Hudson et al. |
| 2018/0135423 A1 | 5/2018 | Dyson et al. |
| 2018/0156045 A1 | 6/2018 | Clum et al. |
| 2018/0171872 A1 | 6/2018 | Dyson et al. |
| 2018/0179956 A1 | 6/2018 | Wertz |
| 2018/0202296 A1 | 7/2018 | Kiener et al. |
| 2018/0223672 A1 | 8/2018 | Beyer et al. |
| 2018/0230832 A1 | 8/2018 | Dierksmeier |
| 2018/0363468 A1 | 12/2018 | Beyer et al. |
| 2019/0040748 A1 | 2/2019 | Clark et al. |
| 2019/0153873 A1 | 5/2019 | Smith et al. |
| 2019/0178087 A1 | 6/2019 | Meier et al. |
| 2019/0249554 A1 | 8/2019 | Garay et al. |
| 2019/0316472 A1 | 10/2019 | Xu |
| 2019/0390567 A1 | 12/2019 | Xu et al. |
| 2020/0190996 A1 | 6/2020 | Osgood et al. |
| 2020/0191000 A1 | 6/2020 | Pang et al. |

FOREIGN PATENT DOCUMENTS

| | | |
|---|---|---|
| JP | 2009221995 A | 10/2009 |
| WO | 2018093627 A3 | 5/2018 |

\* cited by examiner

TURBINE ENGINE AIRFOIL WITH A SCALLOPED PORTION

CROSS-REFERENCE TO RELATED APPLICATION

This application is a continuation of U.S. patent application Ser. No. 16/386,972, filed Apr. 17, 2019, now U.S. Pat. No. 10,844,728, issued Nov. 24, 2020, which is incorporated herein by reference in its entirety.

BACKGROUND

Turbine engines, and particularly gas or combustion turbine engines, are rotary engines that extract energy from a flow of pressurized combusted gases passing through the engine onto rotating turbine blades.

Turbine engines are often designed to operate at high temperatures to improve engine efficiency. It can be beneficial to provide cooling measures for engine components such as airfoils in the high-temperature environment, where such cooling measures can reduce material wear on these components and provide for increased structural stability during engine operation.

BRIEF DESCRIPTION

In one aspect, the disclosure relates to an airfoil for a turbine engine, including an outer wall bounding an interior and defining a pressure side and a suction side extending between a leading edge and a trailing edge to define a chord-wise direction and extending between a root and a tip to define a span-wise direction, a plurality of outlets extending along the outer wall, and a plurality of non-uniform scalloped portions extending along the outer wall, with at least some of the non-uniform scalloped portions interposed between adjacent outlets.

In another aspect, the disclosure relates to a cooled component for a turbine engine, including an outer wall bounding an interior, at least one cooling passage within the interior, a plurality of outlets extending along the outer wall and fluidly coupled to the at least one cooling passage, and a plurality of non-uniform scalloped portions extending along the outer wall, with at least some of the non-uniform scalloped portions interposed between adjacent outlets.

In yet another aspect, the disclosure relates to a method of cooling an airfoil in a turbine engine, the method including supplying cooling air to an interior of the airfoil having a plurality of outlets and a plurality of non-uniform scalloped portions extending along an outer wall of the airfoil, with at least some of the non-uniform scalloped portions interposed between adjacent outlets, and emitting the cooling air through the plurality of outlets.

DETAILED DESCRIPTION

Aspects of the present disclosure are directed to an airfoil. For the purposes of description, the airfoil will be described in the context of a turbine engine. It will be understood that the disclosure can have general applicability for any airfoil, including a rotating or non-rotating airfoil, as well as for an airfoil located anywhere within a turbine engine, including in a turbine section or compressor section. The disclosure can also have general applicability in non-airfoil engine components, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

As used herein, "a set" can include any number of the respectively described elements, including only one element. Additionally, the terms "radial" or "radially" as used herein refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
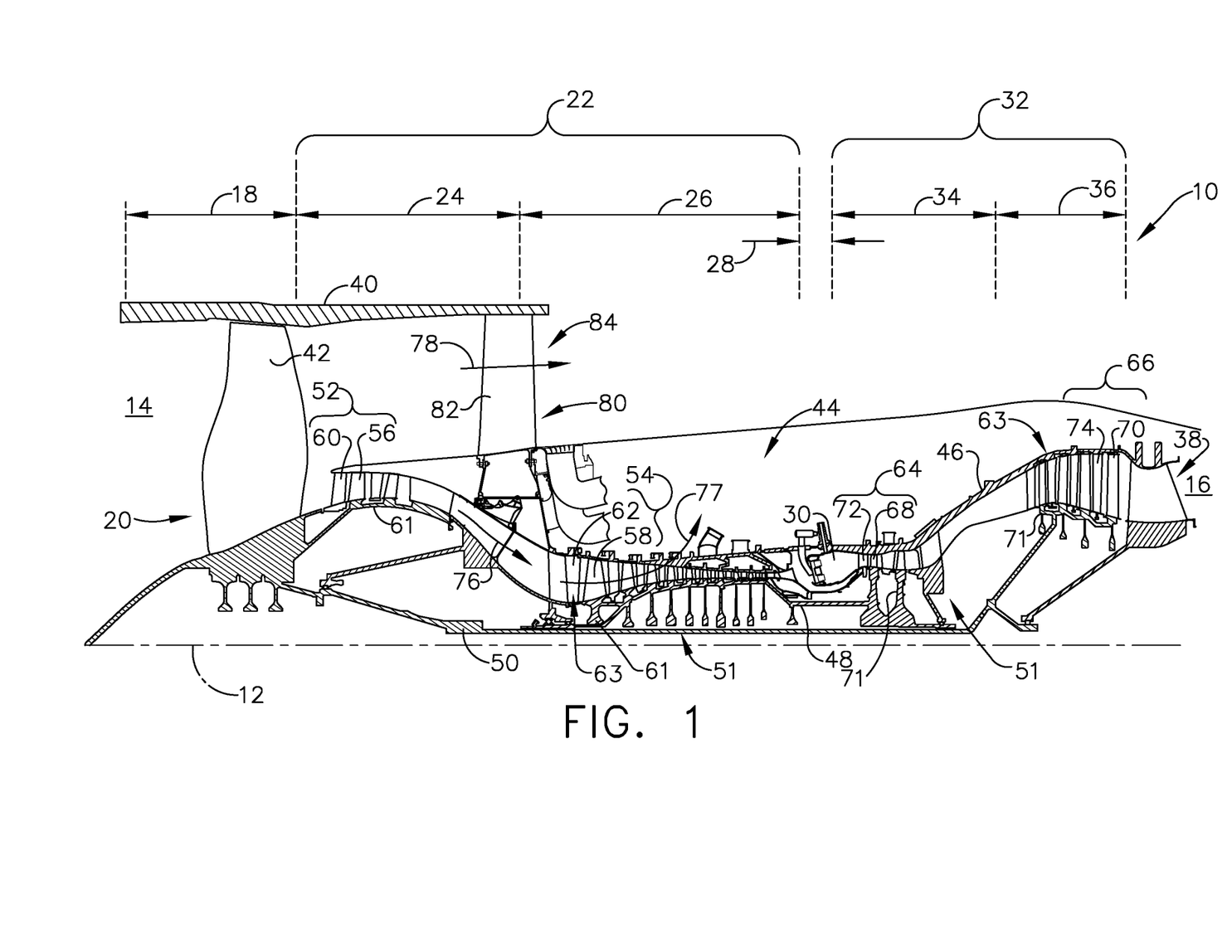
FIG. 1 is a schematic cross-sectional diagram of a turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
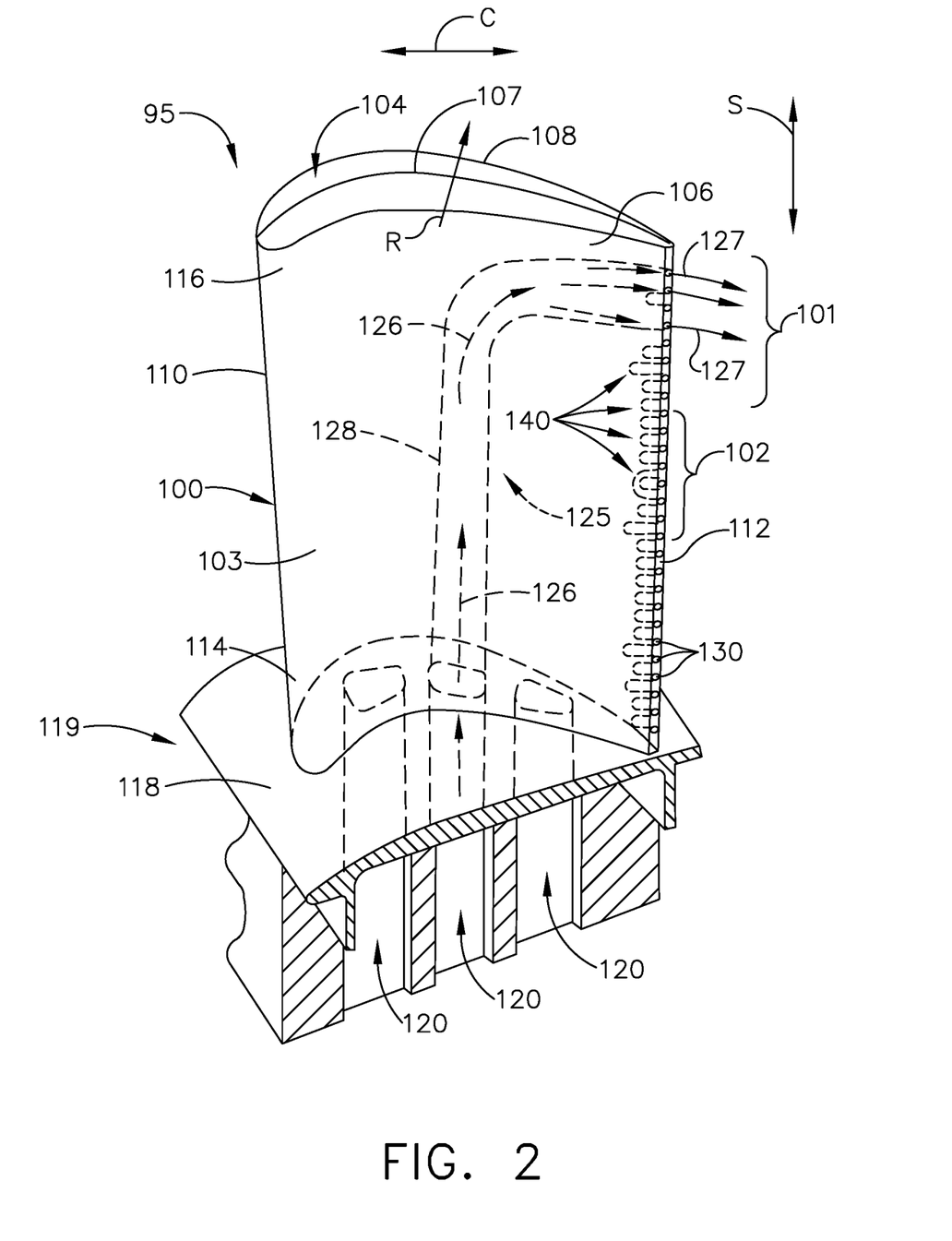
FIG. 2 is a perspective view of an airfoil that can be utilized in the turbine engine of FIG. 1.

Referring now to FIG. 2, an airfoil assembly 95 is shown that can be utilized in the turbine engine 10 of FIG. 1. The airfoil assembly 95 includes an airfoil 100 that can be any rotating or non-rotating airfoil, such as a blade or vane in the fan section 18, compressor section 22 or turbine section 32, in non-limiting examples.

The airfoil 100 includes an outer wall 103 bounding an interior 104 and defining a pressure side 106 and a suction side 108. The outer wall 103 also extends axially between a leading edge 110 and a trailing edge 112 to define a chord-wise direction C, and also extends radially between a root 114 and a tip 116 to define a span-wise direction S.

The airfoil assembly 95 can also include a platform 118 coupled to the airfoil 100 at the root 114. In one example the airfoil 100 is in the form of a blade, such as the HP turbine blade 68 of FIG. 1, extending from a dovetail 119. In such a case, the platform 118 can form at least a portion of the dovetail 119. In another example, the airfoil 100 can be in the form of a vane, such as the LP turbine vane 72, and the platform 118 can form at least a portion of an inner band or an outer band (not shown) coupled to the root 114.

The dovetail 119 can be configured to mount to the turbine rotor disk 71 on the engine 10. The dovetail 119 can comprise a set of inlet passages 120, exemplarily shown as three inlet passages, extending through the dovetail 119 to provide internal fluid communication with the airfoil 100. It should be understood that the dovetail 119 is shown in cross-section, such that the inlet passages 120 are housed within the body of the dovetail 119.

A plurality of outlets 130 can extend proximate the trailing edge 112. The outlets 130 are illustrated as extending along the trailing edge 112, and it is also contemplated that the outlets 130 can extend or be located upstream of the trailing edge 112, such as in the pressure side 106 or suction side 108 adjacent the trailing edge 112. In addition, the outlets 130 are illustrated as circular ejection holes, and the outlets 130 can also include in-line diffusers, diffusing slots, bleed slots, film holes, ejection holes, or channels, in non-limiting examples. While illustrated as being circular, the outlets 130 can also have any suitable geometric profile, including oval, square with rounded corners, or asymmetric/irregular, in non-limiting examples.

In another non-limiting example, the outlets 130 can be centered along the trailing edge 112. In yet another example, the outlets 130 can extend in a direction unaligned with the span-wise direction S along the trailing edge 112. In still another example, the outlets 130 can extend in the span-wise direction S along the trailing edge 112 and be positioned or biased closer to the pressure side 106 or suction side 108.

The airfoil 100 can further include a cooling air circuit 125 fluidly coupling the set of inlet passages 120 to the outlets 130. For example, the cooling air circuit 125 can include the inlet passages 120, at least one interior cooling passage 128 within the airfoil 100, and the outlets 130. Cooling air 126 supplied by at least one of the inlet passages 120 can flow through the cooling air circuit 125, e.g. the at least one interior cooling passage 128, and form outlet airflows 127 through the outlets 130. It will be understood that the interior cooling passage 128 is shown in a simplified or schematic view, and that the interior cooling passage 128 can have any suitable geometric profile, including linear or curvilinear, as well as a constant or varied cross-sectional area, or at least one furcated portion, in non-limiting examples. In addition, while a single interior cooling passage 128 is illustrated, multiple interior cooling passages can be provided, including multiple, fluidly-coupled interior cooling passages within the airfoil 100. In this manner, any or all of the inlet passages 120 can be fluidly coupled to any or all of the outlets 130.

A plurality of scalloped portions 140 can be provided in the outer wall 103 and extending proximate the trailing edge 112. At least some of the scalloped portions 140 can be interposed between adjacent outlets 130. In the illustrated example, each scalloped portion 140 is positioned between adjacent outlets 130. In another example (not shown), multiple scalloped portions can be positioned between adjacent outlets.

The scalloped portions 140 can extend along either or both of the pressure side 106 and suction side 108. In addition, the plurality of scalloped portions 140 can extend at least partially in the chord-wise direction C from the trailing edge 112 as shown. In another example (not shown), a first span-wise region can include scalloped portions interposed between adjacent outlets along the trailing edge, and a second span-wise region can include outlets along the trailing edge with scalloped portions positioned along the pressure side 106 or suction side 108 and not extending to the trailing edge 112. It should be understood that "interposed" as used herein can refer to any portion of the scalloped portions 140 being positioned between adjacent outlets 130. Put another way, a scalloped portion 140 can extend upstream of the trailing edge 112 such that a first region is interposed between adjacent outlets 130. In still another example, an entire scalloped portion 140 can be positioned between, or interposed between, adjacent outlets 130.

Figure 3:
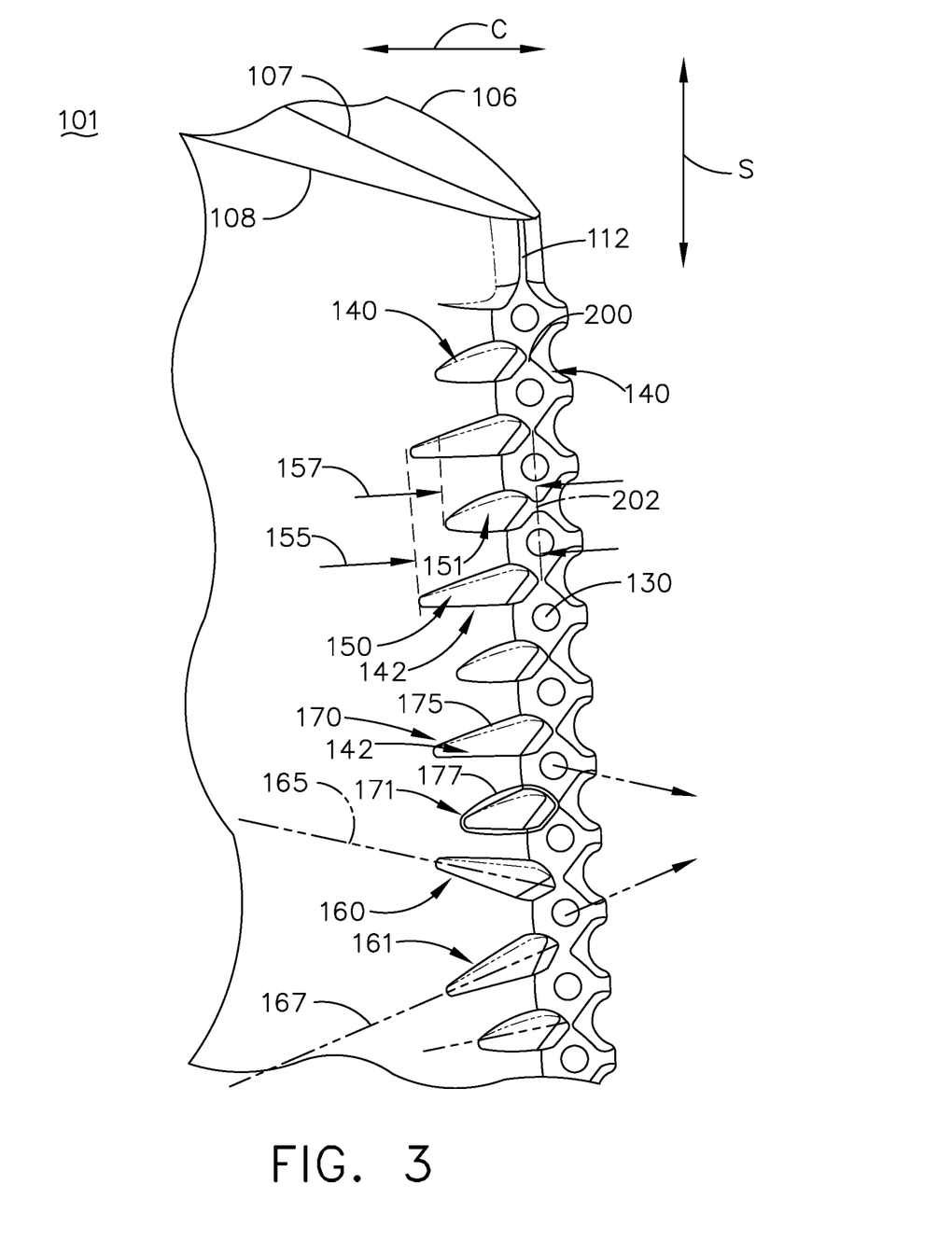
FIG. 3 is a perspective view of a first region of the airfoil of FIG. 2 illustrating a trailing edge with a plurality of scalloped portions according to various aspects described herein.

Referring now to FIG. 3, a first portion 101 of the airfoil 100 is illustrated with the plurality of outlets 130 and scalloped portions 140. The scalloped portions 140 can be formed as discrete portions with space between adjacent scalloped portions 140.

The plurality of scalloped portions 140 can further include a plurality of non-uniform scalloped portions 142. For example, the plurality of non-uniform scalloped portions 142 can include at least one of a non-uniform length, a non-uniform width, a non-uniform centerline, or a non-uniform geometric profile. Put another way, at least two non-uniform scalloped portions 142 can differ in at least one of a dimension, overall size, orientation, shape, or surface feature (e.g. smooth vs. rough, or sharp vs. rounded), in non-limiting examples.

In the example of FIG. 3, the plurality of non-uniform scalloped portions 142 includes, but is not limited to, an elongated scalloped portion 150, a shortened scalloped portion 151, a first angled scalloped portion 160, a second angled scalloped portion 161, a smoothed scalloped portion 170, and a sharpened scalloped portion 171, a widened scalloped portion 180, a narrowed scalloped portion 181, and a variable-width scalloped portion 190.

The elongated scalloped portion 150 can have a first length 155. In the example shown, the first length 155 extends in the chord-wise direction C, and other directions are also contemplated for use including at least partially in the span-wise direction S. The shortened scalloped portion 151 can have a second length 157 less than the first length 155. For example, the second length 157 can be a predetermined fraction of the first length 155, such as half of the first length 155, or 75% of the first length 155, in non-limiting examples.

The first angled scalloped portion 160 can define a first centerline 165. In the example shown, the first centerline 165 extends in a combination of the chord-wise direction C and the span-wise direction S. A second angled scalloped portion 161 can define a second centerline 167 that is unaligned with, or different from, the first centerline 165 of the first angled scalloped portion 160. It is contemplated that the first and second centerlines 165, 167 can differ by a predetermined amount, such as by 5-60 degrees in a non-limiting example.

It is further contemplated that the scalloped portions 140 can shape an outlet airflow 127 (FIG. 2) through the outlets 130. As illustrated, a first outlet airflow direction 127A through a first outlet 131 is in the chord-wise direction C and also along a camber line 107 of the airfoil 100. A second outlet airflow direction 127B through a second outlet 132 is unaligned with the camber line 107 due to an asymmetric positioning, shaping, or orientation of the first and second scalloped portions 141, 142. It is also contemplated that two outlet airflows 127 can be unaligned with one another by a predetermined angular difference, such as differing by between 2 and 50 degrees in a non-limiting example. In this manner the outlet airflows 127 (FIG. 2) can be customized along the trailing edge 112 to have a variety of directions due to the shaping or positioning of the scalloped portions 140.

The smoothed scalloped portion 170 can include a fillet 175 that provides for a rounded, curved, or otherwise smooth transition between the smoothed scalloped portion 170 and the outer wall 103. The sharpened scalloped portion 172 can include a sharp boundary or sharp edge 177 with the outer wall 103. Some non-limiting examples of sharp edges 177 include a bevel, chamfer, sharp corner, or truncated edge.

Figure 4:
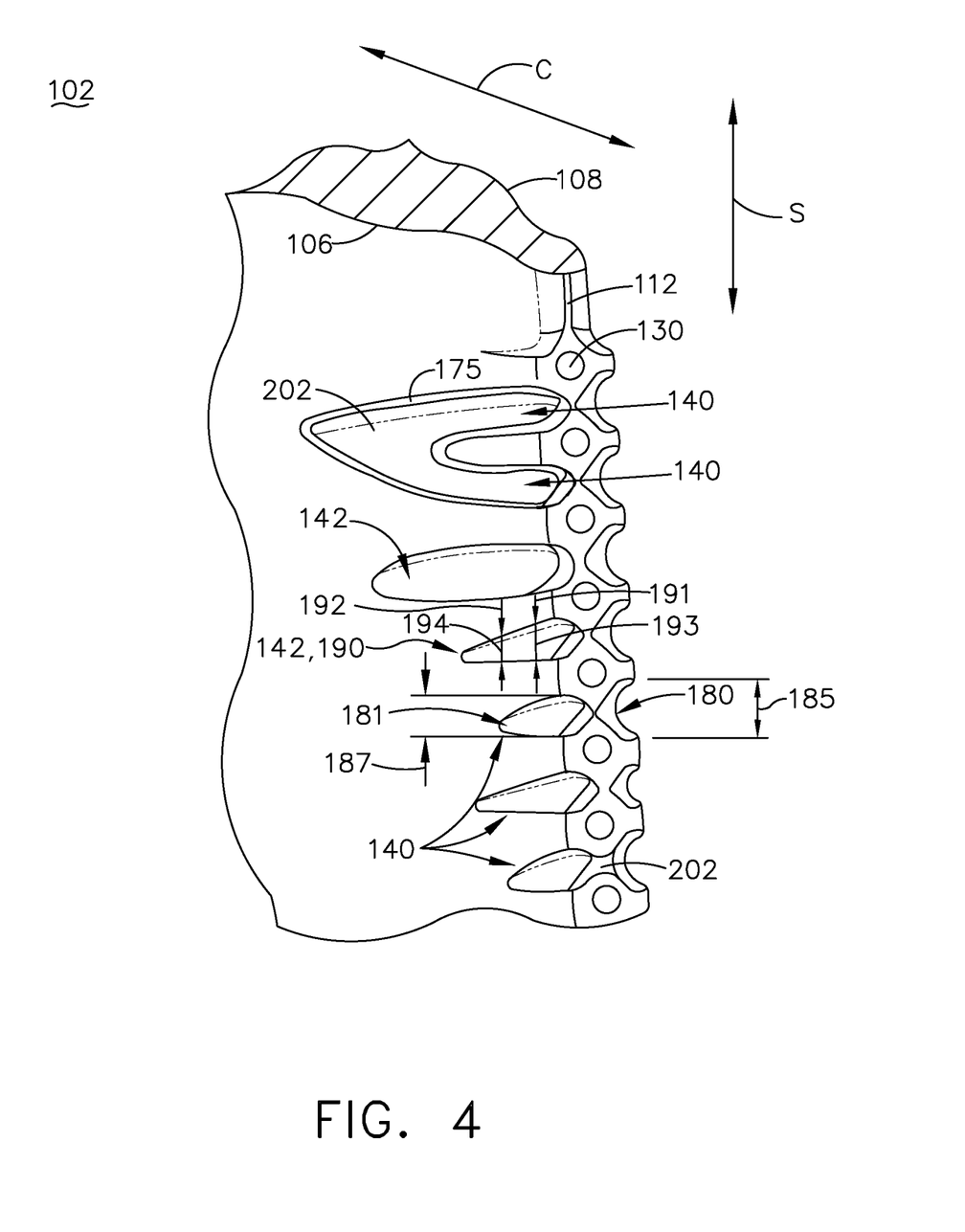
FIG. 4 is a perspective view of a second region of the airfoil of FIG. 2 illustrating the trailing edge with another plurality of scalloped portions according to various aspects described herein.

Turning to FIG. 4, a second portion 102 of the airfoil 100 is illustrated with outlets 130 and additional scalloped portions 140, at least some of which can be non-uniform scalloped portions 142.

The widened scalloped portion 180 is shown having a first width 185, such as a span-wise width. The narrowed scalloped portion 181 is shown having a second width 187 less than the first width 185. In the illustrated example the widened scalloped portion 180 is located on the suction side 106 and the narrowed scalloped portion 181 is located on the pressure side 106.

The variable-width scalloped portion 190 is shown having a first width 191 at a first location 193 and a second width 192 at a second location 194, downstream of the first location 193. The second width 192 in the illustrated example is smaller than the first width 191. It is contemplated that other variable-width scalloped portions (not shown) can have multiple widths, including widths that alternatingly increase and decrease, widths that continuously increase toward the trailing edge 112, or widths that continuously decrease toward the trailing edge 112, in non-limiting examples.

It is also contemplated that adjacent scalloped portions 140 can share at least one contact point 200. In one example, the contact point 200 can be in the form of a single point of contact between adjacent scalloped portions 140 and located span-wise between adjacent outlets 130. In another example, the contact point 200 can form a transitional surface 202 between two or more scalloped portions 140. The transitional surface 202 can extend across the trailing edge 112 between the pressure side 106 and suction side 108, between adjacent outlets 130. The transitional surface 202 can also be positioned on the pressure side 106 or suction side 108 upstream of the trailing edge 112 and extend at least in the span-wise direction S. In this manner, the transitional surface 202 can merge at least two adjacent scalloped portions 140.

In another example (not shown), it is contemplated that the scalloped portions 140 can be utilized to modify, adjust, or customize an airfoil throat area, which is also known in the art as the minimum distance between circumferentially-adjacent airfoils within the turbine engine 10 (FIG. 1) as measured from the trailing edge of a first airfoil to the outer wall of a second airfoil. It can be appreciated that the scalloped portions 140 can cause a variance in airfoil thickness proximate the trailing edge 112 which can also cause at least a span-wise variance in the throat area. Such a varied or custom-tailored throat area can provide for improved overall engine efficiency due to modified airflows through the variable-throat area.

It should be understood that the centerlines, contact points, transition surfaces, widths, and lengths of the scalloped portions 140 can be varied along the trailing edge 112, including in a repeating pattern or a randomized pattern as desired. In one example, the scalloped portions 140 can having alternating centerlines down the trailing edge 112. In another example, the scalloped portions 140 can have a repeating pattern of larger and smaller chord-wise lengths. In still another example, the scalloped portions 140 can have a customized or tailored mix of centerlines, contact points, transition surfaces, lengths, and widths to shape airflows exiting and surrounding the trailing edge 112.

In addition, while the airfoil 100 is illustrated with a combination of non-uniform scalloped portions 142 and contact points 200, it is contemplated that an airfoil within the turbine engine 10 (FIG. 1) can include either or both. For example, an airfoil can include a plurality of uniformly shaped and distributed scalloped portions along its trailing edge, with contact points or transitional surfaces formed between at least two of the plurality of scalloped portions. In another example, an airfoil can include a plurality of non-uniform scalloped portions along its trailing edge without any contact points or transitional surfaces. Any combination of uniform scalloped portions, non-uniform scalloped portions, contact points, or transitional surfaces, including geometric profiles, widths, lengths, centerlines, and the like, can be utilized.

A method of cooling an airfoil in a turbine engine includes supplying cooling air to an interior of the airfoil having a plurality of outlets (FIG. 2) and a plurality of non-uniform scalloped portions (FIGS. 2-4) extending proximate a trailing edge of the airfoil, with at least some of the scalloped portions interposed between adjacent outlets. The method further includes emitting the cooling air through the plurality of outlets. Optionally, the method can include defining, via the plurality of non-uniform scalloped portions, an airflow outlet direction through at least one outlet in the plurality of outlets as shown in FIG. 3.

Aspects of the disclosure provide for a variety of benefits, including that the use of non-uniform scalloped portions can tailor local airflows through the outlets and adjacent the trailing edge to provide cooling of the airfoil, mixing of local airflows near the trailing edge, or purging stagnant air that may be located near the trailing edge. In addition, the scalloped portions can provide for an effectively thinner trailing edge compared to traditional airfoil trailing edges, which can reduce weight, improve bore cooling, and improve aerodynamic performance of the airfoil.

It should be understood that application of the disclosed design is not limited to turbine engines with fan and booster sections, but is applicable to turbojets and turboshaft engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, comprising:
    an outer wall bounding an interior and defining a pressure side and a suction side extending between a leading edge and a trailing edge to define a chord-wise direction and extending between a root and a tip to define a span-wise direction;
    a plurality of outlets extending along the outer wall; and
    a plurality of non-uniform scalloped portions extending along the outer wall, with at least some of the non-uniform scalloped portions interposed between adjacent outlets.

2. The airfoil of claim 1 wherein the plurality of non-uniform scalloped portions comprises at least one of a non-uniform length, a non-uniform width, a non-uniform depth, a non-uniform centerline, or a non-uniform geometric profile.

3. The airfoil of claim 1 wherein the plurality of non-uniform scalloped portions comprises an elongated scalloped portion having a first length and a shortened scalloped portion having a second length less than the first length.

4. The airfoil of claim 1 wherein the plurality of non-uniform scalloped portions comprises a widened scalloped portion having a first width and a narrowed scalloped portion having a second width less than the first width.

5. The airfoil of claim 1 wherein the plurality of non-uniform scalloped portions comprises a variable-width scalloped portion having a first width at a first location and a second width at a second location.

6. The airfoil of claim 1 wherein the plurality of non-uniform scalloped portions comprises a transitional surface located upstream of the trailing edge and merging two adjacent scalloped portions.

7. The airfoil of claim 1 wherein the plurality of non-uniform scalloped portions comprises a first angled scalloped portion having a first centerline extending in both the span-wise direction and the chord-wise direction.

8. The airfoil of claim 7 wherein the plurality of non-uniform scalloped portions comprises a second angled scalloped portion having a second centerline unaligned with the first centerline.

9. The airfoil of claim 1 wherein the plurality of non-uniform scalloped portions comprises a smoothed scalloped portion having a fillet and a sharpened scalloped portion having a sharp edge.

10. The airfoil of claim 1 wherein the outlets extend along the trailing edge, and the plurality of non-uniform scalloped portions extends along at least one of the pressure side or the suction side.

11. A cooled component for a turbine engine, comprising:
an outer wall bounding an interior;
at least one cooling passage within the interior;
a plurality of outlets extending along the outer wall and fluidly coupled to the at least one cooling passage; and
a plurality of non-uniform scalloped portions extending along the outer wall, with at least some of the non-uniform scalloped portions interposed between adjacent outlets.

12. The cooled component of claim 11 wherein the plurality of non-uniform scalloped portions includes a first scalloped portion and a second scalloped portion, with at least one contact point defined between the first and second scalloped portions.

13. The cooled component of claim 12 wherein the at least one contact point is located between adjacent outlets in the plurality of outlets.

14. The cooled component of claim 12 wherein the outer wall comprises a first side and a second side connected by an edge, and wherein the first scalloped portion and the second scalloped portion are both located on one of the first side or the second side.

15. The cooled component of claim 14 wherein the at least one contact point further comprises a transitional surface between the first scalloped portion and the second scalloped portion.

16. The cooled component of claim 15 wherein the transitional surface extends across the edge between the first side and the second side.

17. The cooled component of claim 11 wherein the plurality of non-uniform scalloped portions comprises a variable-width scalloped portion having a first width at a first location and a second width at a second location.

18. The cooled component of claim 11 wherein the plurality of non-uniform scalloped portions comprises at least one of a non-uniform length, a non-uniform width, a non-uniform depth, a non-uniform centerline, or a non-uniform geometric profile.

19. A method of cooling an airfoil in a turbine engine, the method comprising:
supplying cooling air to an interior of the airfoil having a plurality of outlets and a plurality of non-uniform scalloped portions extending along an outer wall of the airfoil, with at least some of the non-uniform scalloped portions interposed between adjacent outlets; and
emitting the cooling air through the plurality of outlets.

20. The method of claim 19 further comprising defining, via the plurality of non-uniform scalloped portions, an airflow outlet direction through at least one outlet in the plurality of outlets.

* * * * *